Dec. 2, 1941.  A. H. DICKINSON  2,264,623
CHARACTER DISPLAYING CONTROL APPARATUS
Filed Jan. 9, 1940   7 Sheets-Sheet 1

INVENTOR.
Arthur H. Dickinson
BY Cooper, Kerr & Dunham
ATTORNEYS

Dec. 2, 1941.　　　　A. H. DICKINSON　　　　2,264,623
CHARACTER DISPLAYING CONTROL APPARATUS
Filed Jan. 9, 1940　　　　7 Sheets-Sheet 3

INVENTOR.
Arthur H. Dickinson
BY Cooper, Kerr & Dunham
ATTORNEYS

Dec. 2, 1941.  A. H. DICKINSON  2,264,623
CHARACTER DISPLAYING CONTROL APPARATUS
Filed Jan. 9, 1940  7 Sheets-Sheet 4

FIG. 9a.

INVENTOR.
Arthur H. Dickinson
BY Cooper, Kerr & Dunham
ATTORNEYS

Dec. 2, 1941.  A. H. DICKINSON  2,264,623
CHARACTER DISPLAYING CONTROL APPARATUS
Filed Jan. 9, 1940  7 Sheets-Sheet 5

INVENTOR.
Arthur H. Dickinson
BY Cooper, Kerr & Dunham
ATTORNEYS

Dec. 2, 1941.  A. H. DICKINSON  2,264,623
CHARACTER DISPLAYING CONTROL APPARATUS
Filed Jan. 9, 1940  7 Sheets-Sheet 6

INVENTOR.
Arthur H. Dickinson
BY Cooper, Kerr & Dunham
ATTORNEYS

Dec. 2, 1941.   A. H. DICKINSON   2,264,623
CHARACTER DISPLAYING CONTROL APPARATUS
Filed Jan. 9, 1940   7 Sheets-Sheet 7

INVENTOR.
Arthur H. Dickinson
BY Cooper, Kerr & Dunham
ATTORNEYS

Patented Dec. 2, 1941

2,264,623

UNITED STATES PATENT OFFICE 2,264,623

CHARACTER DISPLAYING CONTROL APPARATUS

Arthur H. Dickinson, Scarsdale, N. Y., assignor to International Business Machines Corporation, New York, N. Y., a corporation of New York Application January 9, 1940, Serial No. 313,061

9 Claims. (Cl. 177—337)

This invention relates to improvements in control apparatus for character displaying devices.

Heretofore it has been proposed to control the electronic tracing beam of cathode ray tube displaying devices by means of devices termed "pattern component emitters." Such former pattern component emitters comprised a series of disks, one disk for each different character. Each disk comprised two light control tracks for variably transmitting light to a pair of photo-cells. The photo-cells in turn, through amplifier circuits applied varying changes in potential upon the deflecting plates of a cathode ray tube or tubes.

Such former arrangements not only necessitated the use of a separate disk for each different character, but in addition there had to be sets of light sources and sets of photo-cells for each disk with separate amplifier units for each different photo-cell.

The present invention has for one of its objects, the simplification of features of former control apparatus to the general end that a single disk may be used for a number of different characters with the attendant possibility of decreasing the number of lamp sources, photo-cells and amplifier units.

A further object resides in the provision of a control apparatus for cathode ray tube displaying devices which enable the number of wires connecting the display tubes with the control apparatus to be materially reduced. Heretofore, the deflecting plates of the different cathode ray tubes had to be individually connected to the control apparatus and to the amplifier units therein. According to the improved control arrangement the lines leading to the deflecting plates of a plurality of cathode ray tubes can be and are connected to single sets of amplifier terminals.

A further object of the present invention resides in the provision of a control apparatus adapted to successively transmit to a set of cathode ray tubes the potential variations which tend to trace successively upon the screens of the tube or tubes a set of parts of a composite character and to provide in the control apparatus timing devices and cooperating selecting devices to make a tube or tubes effective to display a single selected character or characters and to suppress the display of unwanted parts of the composite character.

A further object of the present invention resides in the provision of combined control and cathode ray tube displaying apparatus adapted for control by differentially set selecting apparatus.

A further object of the present invention resides in the provision of a remote controlled displaying apparatus which may be readily coupled to any position indicator such as a float in a water tank and which will give an indication in plainly readable numerals as distinguished from pointer readings.

Further and other objects of the present invention will be hereinafter set forth in the accompanying specification and claims and shown in the drawings which show by way of illustration a preferred embodiment and the principle thereof and what I now consider to be the best mode in which I have contemplated of applying that principle. Other embodiments of the invention employing the same or equivalent principle may be used and structural changes made as desired by those skilled in the art without departing from the present invention and within the spirit of the appended claims.

Before describing the system in detail, it may be said to comprise two main units. One unit is the displaying unit which displays characters—in the present instance digits—upon the screens of one or more cathode ray tubes. The other unit, which comprises the control apparatus of the system, includes a simplified form of pattern component emitter unit which generates and transmits sets of changing potentials to the cathode ray tubes so that the latter tend to successively visually display all of the different digits. The control apparatus also includes timing selectors which operate synchronously and in timed relation with the pattern component emitter unit and which timing selectors are brought into operation or kept out of operation by supplemental digit selector devices, which, according to the present embodiment, are located in the control apparatus unit. Such supplemental digit selectors may, however, be located at any desired point. The function of the timing selectors in cooperation with the digit selectors is to call in or block out of operation a cathode ray tube or tubes. In explanation, if there is no digit selection whatsoever, no character will be displayed. If there is a digit selection of say a single digit, a cathode ray tube will be effective for the time period to display the selected digit only and ineffective at other times when other digits of the series would otherwise be displayed. The timing selector control and digit selector control over the cathode ray tubes is effected over special circuits which individually extend to individual control grids of the different cathode ray tubes. The tracing potential control to the deflecting plates of the cathode ray tubes is over independent circuits to the terminals of an amplifier unit in the pattern component emitter unit. The deflector plate circuits are common to the different tubes of the displaying apparatus thereby simplifying wiring.

The digit selecting devices comprise differentially settable members which in the present embodiment are positioned from a position indicator in the form of a float. Other setting devices may, however, be used depending upon the use to which the apparatus is to be put. The digit selectors comprise switching mechanisms which preferably through relays render selected and related timing selectors effective.

In more detail in the drawings, 20 designates a tank containing liquid. A suitably counterweighted float 21 is provided within the tank. Attached to the float is a chain 22 which connects to the counterweight and which passes over a pair of sprockets 23—24 disposed at the side of the control box adjacent the top of the tank. Sprocket 24 (see Fig. 3) is an idler sprocket and sprocket 23 is attached to a drive shaft 25.

It will be appreciated that with a varying level of liquid in the tank 20, the drive shaft 25 will assume different differential positions according to the differential level of the liquid in the tank. The driving relations of the parts is such that shaft 25 revolves through more than one revolution upon change of level in the tank from a full level condition to a low level condition. Fast to shaft 25 is a gear 26. Gear 26 through a train of gears individually designated 27, 28, 29 is adapted to drive and differentially position a second shaft 30.

According to the present embodiment it is assumed that tank 20 is sixteen units deep, that is to say, it can contain from 0 to 16 feet of water. Shaft 25 will move one-half of a revolution for each unit change of liquid level in the tank 20, that is to say, if the tank 20 is empty, and one foot of water is put into the tank 20, the shaft 25 will move 180 degrees clockwise from the position shown in Fig. 2. The driving relations between shaft 25 and shaft 30 are 16 to 1. For one-half a revolution of shaft 25 in a clockwise direction shaft 30 will be advanced $\frac{1}{32}$ of a revolution.

Figure 1:
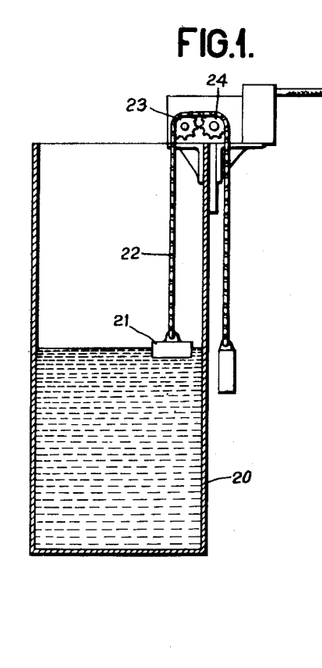
Figure 1 shows somewhat diagrammatically a tank and control apparatus and a distant indicator.
Figures 2, 3:
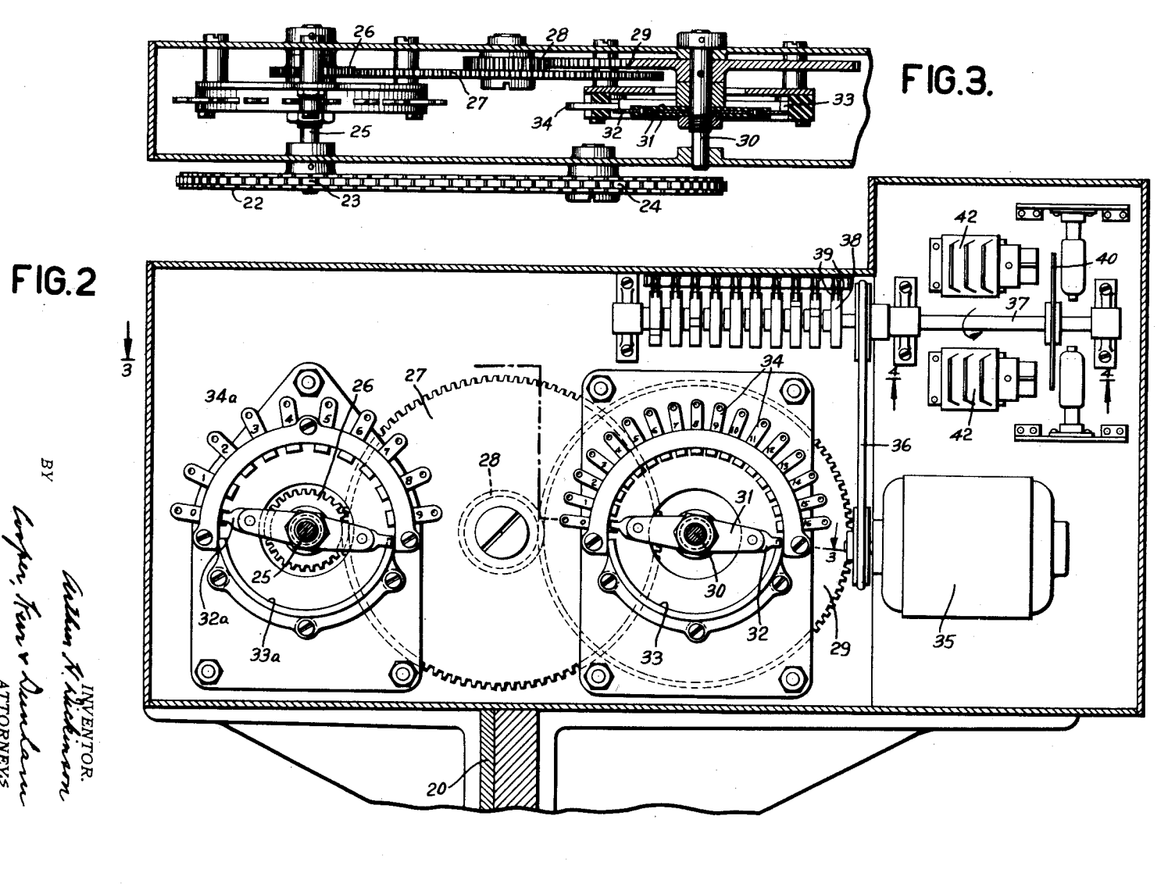
Fig. 2 is an inside elevational view of the control apparatus proper which is shown at the top of the tank of Fig. 1.
Fig. 3 is a detail sectional view taken on line 3—3 of Fig. 2 and looking in the direction of the arrows.

Referring now to shaft 30, this shaft has fixed to it a pair of insulated arms designated 31 in Fig. 3. These insulated arms carry between them a contacting switch arm 32. One end of the switch arm 32 traverses a common conducting segment 33 and the other end of the switch arm 32 is adapted to establish contact with one or the other of the individual segments designated 34 on Fig. 2. It may be mentioned that the switch arm 32 is of such breadth that in passing from one segment to the next adjacent segment 34 it spans both of the segments. A similar switching structure is provided on shaft 25. It includes a switch arm 32a traversing a common segment 33a and adapted to contact with individual segments 34a. It will be noted that there are ten segments 34a and seventeen segments 34. The switching devices just described constitute differentially settable selectors for selectively controlling the remote indicator.

General characteristics of cathode ray tubes

Before describing the details of the indicating device and the control therefor, certain general characteristics of cathode ray tubes which are used in the distant indicator will be briefly described. Several typical and suitable cathode ray tubes are illustrated diagrammatically on the circuit diagram (Fig. 9b). Each tube comprises an evacuated body into which extends a heater element 11. Associated with the heater element is a cathode 12 providing a source of electrons. Also in the evacuated body and disposed in the order from left to right are a grid 13, an anode number "1" designated 14, an anode number "2" designated 15, and two pairs of deflector plates. The upper and lower vertical deflector plates are respectively designated YU and YL and the horizontal deflector plates are respectively designated XL and XR. XL signifies horizontal deflection to the left and XR signifies horizontal deflection to the right. YU signifies upward vertical deflection and YL signifies lowering or downward vertical deflection. The right hand end of the cathode ray tube includes the usual fluorescent screened end 16. The "Y" deflector plates are plates above and below the center axis of the tube. The "X" deflector plates are disposed to the right and left of the center axis of the tube.

In the operation of a cathode ray tube, if no potential is applied to either sets of plates, the stream of electrons will be emitted along the central axis of the tube and impinge on the fluorescent screen 16 at the center of the screen. If, however, the potential on the horizontal and vertical deflecting plates is changed, the stream of electrons can be deflected either upwardly or downwardly or to the right or to the left or in combined resultant directions. Changing relative potential on the Y set of plates will bring the stream of electrons up or down and similarly changing the relative potential on the X plates will divert the stream of electrons alternatively to the right or left. By providing proper potential and proper changing potential over a period of time on both sets of plates any desired figure or character can be traced and visibly displayed on the fluorescent screen 16. By repeatedly tracing the beam of electrons to the proper points or areas of the screen, an image can be produced which can be visibly read in the day time or at night. Cathode ray tubes are adapted to operate and deflect electron beams at an exceedingly high frequency. They may accordingly be termed "inertia free image tracing devices." Such devices furthermore require a mere change of voltage on the plates to deflect the electron stream and current consumption is negligible. This low current consumption adapts these tubes for use as indicators at a considerable distance from the control point.

Having generally described the characteristics of the cathode ray tubes there will now be described one manner of providing the deflecting voltages which control the movements of the electron beams for tracing the images upon the various cathode ray tube screens.

*Pattern component emitter unit*

Mounted within the control box is a driving motor 35. This motor through any suitable drive such as the belt and pulley 36, is adapted to drive a shaft 37 which is suitably mounted for rotation. Shaft 37 at one end drives a number of commutator devices one of which is designated 38. Ten of these commutators are provided. Each commutator (see Fig. 9a) comprises an insulated portion over the greater portion of the periphery of the commutator with a conducting portion at a single point of the commutator. Trailing on the periphery of each commutator are a pair of brushes which are designated 39 on Fig. 2. The conducting segments on the different commutators are so arranged as to close at different angular positions of rotation of the shaft 38 as will be readily understood by inspection of Fig. 9a. The purpose of these commutators and their timing will be subsequently further explained.

Figure 4:
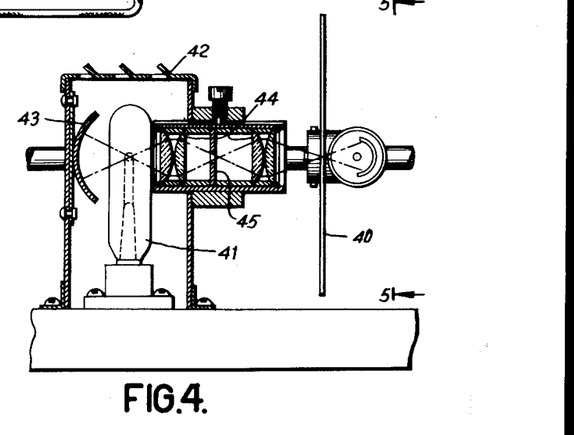
Fig. 4 is a detail sectional view taken on line 4—4 of Fig. 2.

Again referring to Fig. 2, the shaft 37 is also adapted to drive and rotate an element such as a disk 40. This disk 40 is generally transparent, but it is provided with two concentric opaque tracks 40X and 40Y (see Fig. 5). To direct light to the tracks a pair of light sources are provided. Each source of light preferably comprises a lamp 41 within a lamp box 42 (Fig. 4). A suitable reflector 43 directs the light from the lamp through a lens system 44 and through an apertured diaphragm 45 which is provided to direct and concentrate the light received from the light source on to and through the related partially opaque track. One light source directs light to and through the 40X track and the other light source directs light through the 40Y track. Upon the opposite side of the disk 40 from the light sources, there are provided two photo-cells which are respectively designated 46X and 46Y.

It may be explained that if the width of one of the tracks such as 40X is varied at different angular positions around the disk 40, different amounts of light will be allowed to pass to the photo-cell 46X upon rotation of the disk. This variable illumination will vary the current and/or voltage output in a circuit controlled by this particular photo-cell. The photo-cells act to allow more or less current to flow in their output circuits depending upon the amount of light which they receive.

Referring again to Fig. 5 it will be noted that the disk 40 is shown as divided up into segment portions each of which has a designating figure such as 0, 1, 2, etc., up to 9.

Figure 7:
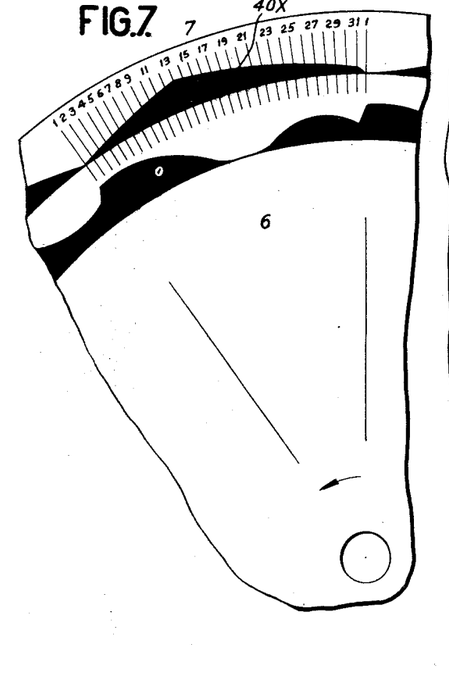
Figs. 7 and 8 are enlarged details of portions of certain segment sections of the disk shown in smaller scale on Fig. 5.
Figure 8:
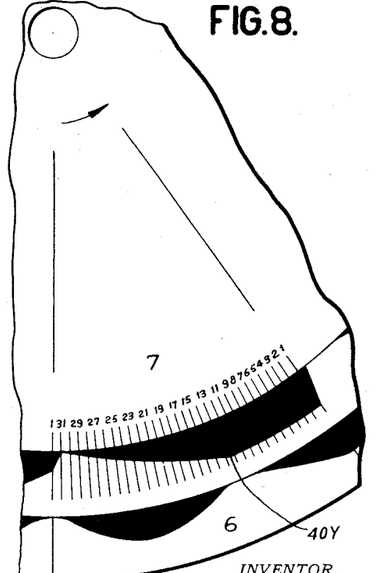

It may be explained that the 40X track for a given segment section, for example the section allotted for the character 7, will provide a variable amount of light, to influence the related photo-cell 46X whereby it supplies changes in potential and component voltages to the X plates of the cathode ray tubes for effecting horizontal deflection for tracing the character 7. Similarly the 40Y track for the related segment section controls the 46Y photo-cell whereby the proper changing potential is applied to the Y plates to effect vertical deflection for tracing the character 7. Inasmuch as the two lamp sources for the different tracks are 180 degrees apart the related sections of the opaque tracks are similarly displaced 180 degrees with reference to one another for a corresponding digit. This 180 degrees relation of the tracks is shown in Figs. 7 and 8. The outside track of Fig. 7 is the track for controlling the changing potential on the X plates for tracing the digit 7. The inside track on Fig. 8 on the other hand, is the track for controlling the changing potential on the Y plates for tracing the digit 7.

The manner of laying out the various segments of the disks will now be explained.

Figure 6:
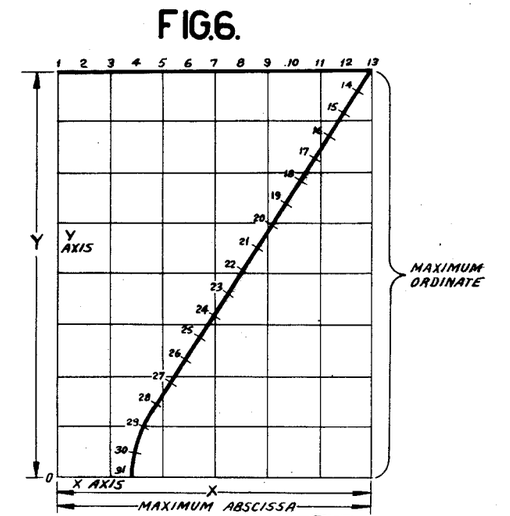
Fig. 6 is a diagrammatic graph view with plotting points for the character 7.

Referring to Fig. 6, on this figure, the outlines of the numeral 7 have been laid out. The numeral 7 has been divided into a set of sections of equal length, this particular character being divided into sections 1 to 31 inclusive. In order to trace the electron beam for the upper horizontal part of the Fig. 7, the Y component voltage should be maintained constant while points 1 to 13 are traced. If the inner track (for controlling the Y potential) on Fig. 8 be examined it will be found that the 40Y track has a constant maximum width for all points from 1 to 13 inclusive. Thereafter for further points along the figure 7 (see Fig. 6) the tracing beam should be caused to both descend and move to the left. To cause descent of the beam there is a gradual diminution of the width of the 40Y track from point 13 (Fig. 8) back to point 31.

Referring now to the 40X track (Fig. 7) the X component at point 1 is 0. From this point 1 to point 13, the 40X track gradually increases in width as indicated on this segment of the disk. From point 13 back to point 31, the 40X track progressively diminishes in width. Referring to Fig. 7, it will be noted that there is a zone allotted from point 31 to point 1. This provides for the return of the beam from the terminating tracing point 31 to the beginning point 1 of the next segment which is allotted to another character.

To determine the width of the 40Y track at any point as for example, point 19, the Y ordinate distance on Fig. 6 between the X axis and point 19 is determined. This distance is then multiplied by a constant, the value of which is determined in a manner to be subsequently described. The resulting amount will give the width of the Y track at point 19 on the disk.

The constant above referred to is the ratio of a predetermined arbitrary maximum width of the Y track on the disk with respect to the maximum ordinate value for the character in Fig. 6. This arbitrary value depends upon the circuit relations and characteristics of the photo-cells and amplifier tubes which are used in connection with the track.

The width of the X track at point 19 is the X abcissa distance between the Y axis and point 19 multiplied by another constant. This constant is the ratio of the predetermined arbitrary maximum width of the X track with respect to the maximum abcissa value for the character in Fig. 6. This arbitrary value again depends upon the circuit relations and characteristics of the photo-cells and amplifier circuits.

According to the present arrangement the constants used are identical but this is not essential.

Figure 5:
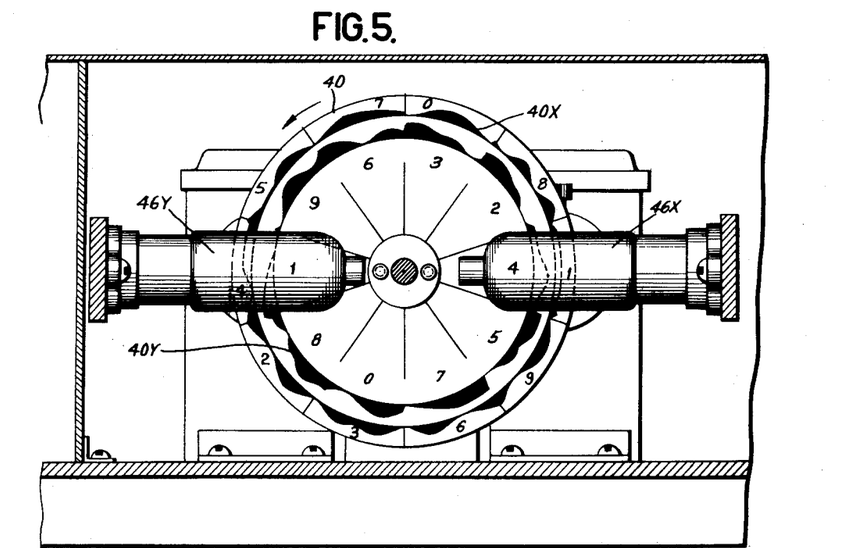
Fig. 5 is an end view of the part of the apparatus shown in Fig. 4, the view being taken on line 5—5 of Fig. 4 and looking in the direction of the arrows.

Fig. 5 shows the configuration of the X and Y tracks for controlling related photo-cells so that the cathode ray tube or tubes will successively display all of the different digits of a set, i. e. 1 to 9 and 0 inclusive. Each complete track is divided into a number of segments, one segment for each different digit and the segments of both tracks are shown numbered with digits which comprise the digit displayed by the cathode ray tube when that particular segment is being scanned by the photo-cells. As shown in Fig. 5 the 46X photo-cell is scanning the 1 segment of the 40X track while the 46Y photo-cell is scanning the 1 segment of the 40Y track. The different segments related to different digits are scanned in succession. It will be noted that the successive segments do not follow the successive order of the digits. However, they can be transposed in position on the disk to follow the order of the digits or they can be indiscriminately arranged as shown.

With the disk 40 in continuous counterclockwise rotation, the 46X photo-cell will receive such varying amounts of illumination as to successfully afford changing potential for first tracing the outline of the character 1, then as the next segment is reached the character 9, then for the next segment the character 6, then 3, 2, 4, 5, 7, 0 and 8 and then recurring again to 1. The other photo-cell 46Y will, upon rotation of the disk 40 from the position shown, first trace the character 1, then 9, then 6, then 3, then 2, then 4, then 5, 7, 0 and 8, then repeat with 1 again.

From the foregoing explanation, it will be understood that if both light sources were on and both photo-cells were in circuit through certain amplifiers, to a given cathode ray tube, as the disk 40 rotated through one complete revolution all of the various characters comprising the digits 1 to 9 inclusive and 0 would be successively traced on a cathode ray tube screen. The order of succession in which the different characters are traced by a tube would be 1, 9, 6, 3, 2, 4, 5, 7, 0, 8 and thereafter there would be a repeated tracing in the same characters in the order mentioned.

It may be mentioned that the disk 40 is rotated extremely rapidly and the rate of rotation is such that a visual image will be displayed which can be seen even if the cathode ray tube is operative only for one segment position of the disk. To provide for such single segment visual display the commutator devices 38 previously alluded to are utilized, as will be hereinafter described.

The disk device just described constitutes what might be termed "a pattern component emitter unit" and if such disk is maintained in a state of rotation at relatively high speed it will be appreciated that such disk can be used to progressively vary the X component voltages and the Y component voltages which are applied to the deflecting plates of the cathode ray tube or tubes to afford display of one or more characters. It may be further explained that a single disk unit can be utilized for controlling one or more cathode ray tubes.

Before describing the commutator and switching control for the various cathode ray tubes, the amplifier circuits for the photo-cells will be explained.

*Photo-cell and amplifier units*

As explained before two photo-cells 46Y and 46X are employed.

Amplifier circuits preferably including electron discharge devices are controlled by the photo-cells 46X and 46Y. These amplifier circuits are adapted to produce variations in potentials across the deflecting plates of the cathode ray tubes in accordance with the variations of light impressed on the photo-cells.

Consider, for example, photo-cell 46X which is utilized to control the horizontal deflection of the cathode ray beam in one or more of the cathode tubes. Such photo-cell 46X is connected in series with a battery 50 and a resistor 51 whereby the difference of potential across the resistor varies in accordance with the illumination of the photo-cell. The grid cathode circuit of a vacuum tube 52 conveniently biased negative at all times by the battery 53 includes a portion of the resistor 51 preliminarily adjustable by a contact 54 on the resistor. The plate cathode circuit of the tube 52 includes a B battery or other source of direct current 55 and a resistor 56 in series therewith intermediate the positive side of the battery 55 and the plate of the tube 52. For impressing a proper voltage across the horizontal deflecting plates XL and XR of the cathode ray tubes which are connected to the terminals 57 and 58 of the amplifier unit, a biasing network is preferably provided including a resistor 59 connected across a source of voltage preferably comprising the series connected batteries 60 and 61. The conductor intermediate batteries 60 and 61 is also connected to a preliminary adjustable contact tap 62 on the resistor 56 and the terminals 57 and 58 are respectively connected to a preliminary adjustable contact tap 63 on the resistor 59 and to the positive side of the battery 55 (i. e. the positive end of the resistor 56).

It will now be seen that if the photo-cell 46X receives illumination or a predetermined maximum illumination, the grid of the tube 52 will have a predetermined maximum negative bias. The contact arms 54, 62 and 63 are conveniently so adjusted (in a manner which will be readily understood by those familiar with the art) that for this maximum illumination of the photo-cell 46X the resulting maximum negative bias on the grid on the tube 52 will be such that the output voltage between the terminals 57 and 58 will maintain the electron beam at one side of its horizontal path of travel, viz. the left hand side in the apparatus illustrated. That is, although the contact arm 62 is negative with respect to the positive side of the battery 55, the biasing network including the resistor 59 imposes sufficient opposing voltage in the deflector plates XL, XL so as to make the terminal 57 just sufficiently positive with respect to the terminal 58 to maintain the electron beam in its extreme left hand position. Now, as the illumination of cell 46X decreases (due to an increase in width of the opaque portion of the track) the negative bias on the grid of the tube 52 decreases, resulting in an increase in plate current and corresponding increase of the potential drop between the positive side of the battery 55 and the contact 62. As a result, the potential of terminal 57 becomes less positive with respect to the terminal 58; the adjustments of the contacts on the resistors being conveniently such that the potential between the terminal 57 and 58 becomes zero for an illumination of the photo-cell 46X which is intended to represent a positioning of the cathode beam at the middle of its horizontal path. Decrease of the illumination beyond this point results in making the terminal 58 positive with respect to the terminal 57, until at the point of minimum illumination the cathode beam is deflected to its extreme right hand position.

It will be understood that the amplifier and balancing circuits controlled by the photo-cell 46Y are conveniently identical with those herein above described for the photo-cell 46X so that the vertical displacement of the cathode beam between plates YL and YU is obtained by a corresponding similar variation of output potential between the terminals 66 and 67 to which these plates are connected.

Since it will now be understood that the actual position of the cathode ray beam at any instant depends upon the controlling potentials applied to both sets of deflecting plates XL, XR and YL, YU, the position of the beam is directly controlled (through the instrumentality of the amplifier circuits described) by the amount of illumination respectively received by the photo-cells 46X and 46Y. Thus as the illumination respectively received by these photo-cells varies during rotation of the pattern component emitter, the cathode ray beam of any one of the tubes traces a path to portray the particular digit character corresponding to the sector of the disk which is being scanned by the photo-cells. If the tracks of the segment portions pertaining to the digit 7 are being scanned, such scanning so controls the illumination of the photo-cells that the tracks 40X and 40Y respectively provide a predetermined variation in the illumination of the photo-cells 46X and 46Y for each traverse of the segment of the disk providing resultant corresponding variations in deflecting potential on the plates of the cathode ray tubes whereby the cathode ray beam traces a path, in this case, a path depicting the character 7, which is predetermined by the zone of the disk which is being scanned. As shown on Fig. 9b the lamps 41 and the motor 35 may receive current from a suitable source 68 through a suitable switch 69.

Figure 9A:
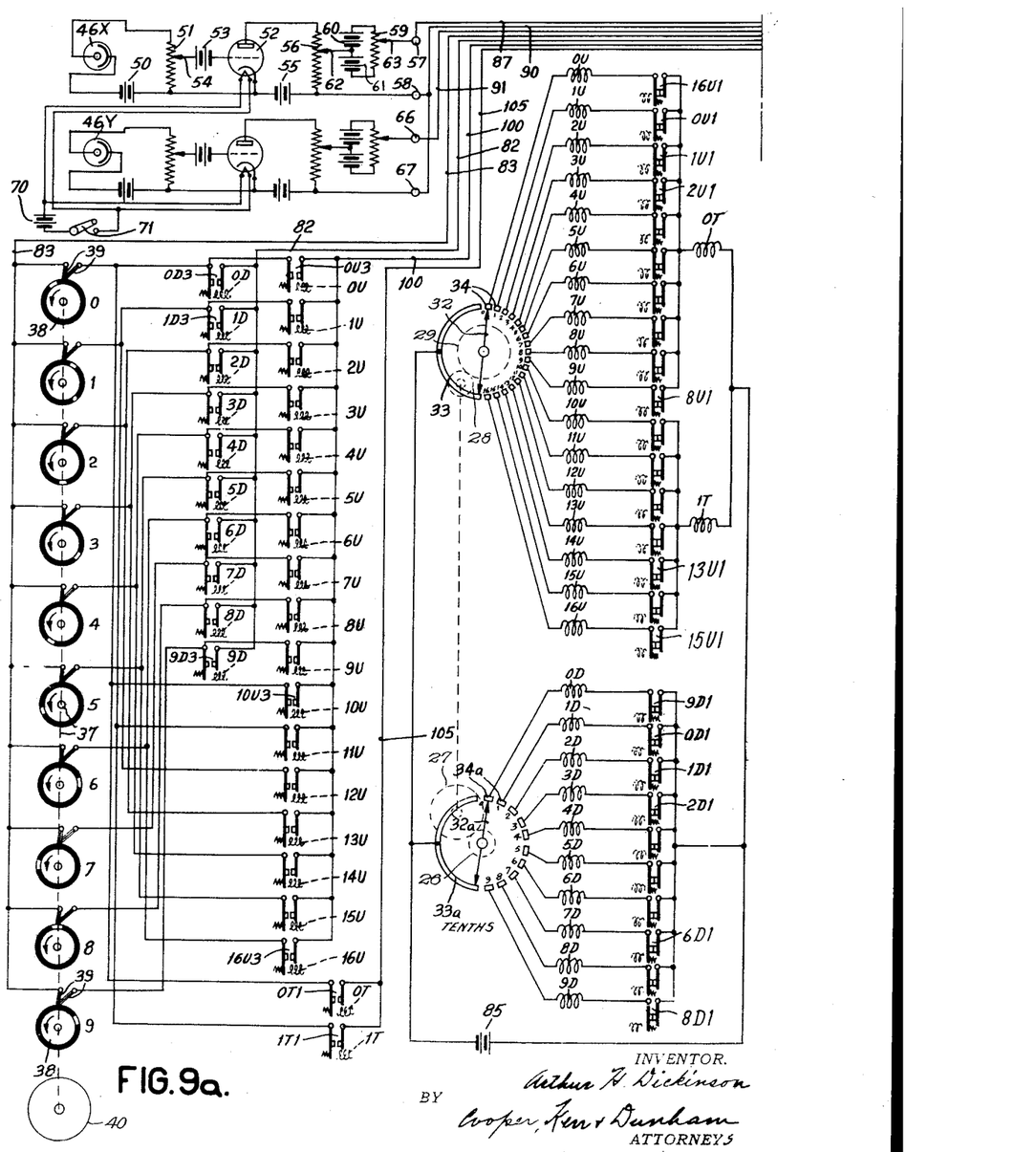
Figs. 9a and 9b, taken together, with Fig. 9b to the right of Fig. 9a, show the complete circuit diagram of the apparatus.
Figures 9B, 10:
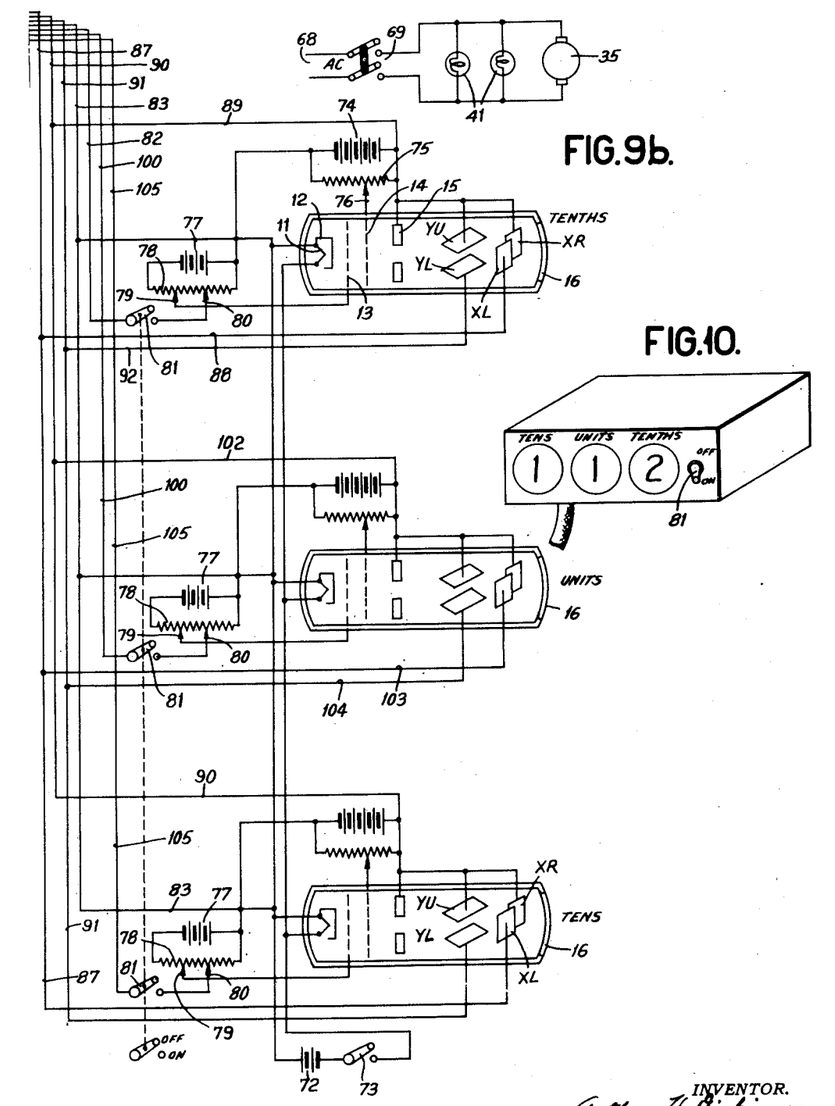
Fig. 10 is an enlarged detail view of the distant indicator cathode ray tube number displaying unit.

The heater elements of the amplifier tubes 52 are preferably arranged to receive current from a suitable source 70 upon closure of switch 71 (Fig. 9a). As shown in Fig. 9b a battery 72 affords current supply for the heater elements of the cathode ray tubes upon closure of switch 73.

Referring to Fig. 9b as is customary with cathode ray tubes a biasing battery 74 is provided for each tube. This battery is shunted by a resistor 75. A contact tap 76 on this resistor connects to anode 14 (the number "1" anode of the cathode ray tube). As is customary in cathode ray tube practice the commonly connected deflector plates YU and XR and the number "2" anode designated 15 are commonly connected to the positive end of the resistor 75.

Before describing the switching control for the cathode ray tubes it may be mentioned that if grid 13 of any tube has applied to it a certain maximum negative bias the effect will be to wholly suppress the impingement of the electron beam upon the fluorescent screen 16. On the other hand if this certain maximum negative bias is reduced on the grid 13 the effect will be to allow the impingement of the beam on the screen. To provide such grid bias control a battery 77 is provided shunted by resistor 78. Cooperating with the resistor are two adjustable contact taps 79 and 80. Tap 79 connects to the grid 13. The positive end of the resistor 78 is connected back to the cathode heater element 12. If the entire resistor 78 is in circuit with the battery 77 the certain maximum negative bias previously mentioned will be applied to the grid 13. On the other hand if a part of the resistor 78 (i. e. the portion to the right of contact tap 80) is shunted out, then this certain maximum negative bias will be reduced to allow impingement of the electron beam.

The application of maximum negative bias and the reduction of the maximum negative bias for a particular tube or tubes is controlled from the commutator devices previously mentioned. For example, if it is desired to display the character 7, the brushes of the related commutator 38 establish contact during the scanning of the 7 zone of the disk 40 and upon such commutator brushes establishing contact the portion of the resistor 78 to the right of the tap 80 is shunted out thereby allowing flow of the electron beam with the resulting display of the character on the screen. Such shunting circuit will be traced subsequently.

Before tracing the shunting circuit from the tap 80 to the commutator it may be explained that the tank controlled switching mechanism previously described in connection with Figs. 2 and 3, is utilized to selectively control which commutator of the set is to be connected to a particular cathode ray tube. These tank controlled switching circuits will now be described.

Let it be assumed there is one-tenth of a foot of water in the tank, switch arm 32a will then stand on the 1 segment spot of the 34a set and a circuit will be established from a suitable source of current such as battery 85 (Fig. 9a) through the common strip 33a through the switch arm 32a through the 1 segment, through the 1D relay, through relay contacts 0D1 and back to the other side of the battery 85. At this point the purpose of the contacts such as 0D1 may be described.

As explained before switch arm 32a is a bridging contact, that is, it makes contact with segment 1 before it leaves contact with segment 0. So long as the switch arm 32a is making contact with 0 segment the 0D relay will be energized. With this relay energized the 0D1 contacts will be open and accordingly it will be impossible to energize the relay 1D until the switch arm 32a has completely left the 0 segment and brought about de-energization of relay 0D. This switching arrangement is provided to give accurate indication and to prevent delineation of more than one character at a time by any cathode ray tube. The contacts such as 0D1 and 1D1 are also used to provide a similar control when the tank controlled switch moves from a higher to a lower level condition. Thus if the arm 32a stands on the 2 segment and moves back to establish contact with the 1 segment the 1D relay will be energized, opening contacts 1D1 and causing de-energization of the 2D relay. With relay 1D energized in the manner previously explained, contacts 1D3 will be closed. Such contacts it will be noted are in a circuit to the number 39 brushes of the 1 commutator and the 1D3 contacts on their opposite side connect to a shunt circuit 82 which extends over through a manually controlled switch 81 to the tap 80. Tracing now the circuit from the other side of the commutators, such common circuit is designated 83. If 83 be traced from Fig. 9a to Fig. 9b, it will be found to extend to a line 86 which leads to the right hand end of resistor 78. With the number 1 commutator in circuit the high negative bias on the tenths cathode tube is reduced every time the photo-cells 46X, 46Y scan the number 1 segment of the disk 40. With such high negative bias so reduced the potential of terminal 57 will be applied through a line 87 and a wire 88 to the XL plate of the cathode ray tube. The XR plate is connected back to the 58 terminal via a wire 89 and a line 90. Accordingly, the variations in potential across the terminals 57 and 58 will be applied to the XR and XL plates. The Y output terminal 66 connects to a line 91 which connects to a wire 92 leading to the YL deflecting plate. The YU deflecting plate is connected back to the 67 terminal through the wire 89 and line 90. In this way the Y deflecting voltages are applied to the YU and YL plates. This application of potentials to the deflecting plates of the tenths tube will display 1 on that particular tube signifying that there is one-tenth of a foot of water in the tank. With only one-tenth of a foot of water in the tank it will be appreciated that the units and tens tubes should both depict 0. The control circuits for the units tube will now be traced. Switch arm 32 (Fig. 9a) will be standing on the 0 segment spot of the 34 set. Relay 0U will be energized, the circuit being completed back to line through relay contacts 16U1 now closed. This circuit extends back to the other side of the line through a relay 0T which is energized at such time. With relay 0U energized, relay contacts 0U3 are closed connecting the 0 commutator to a line 100 which connects to switch 81 (Fig. 9b) to the tap 80 pertaining to the units cathode ray tube. This established circuit will remove the maximum negative bias from the units cathode ray tube. As before, the positive end of the resistor 78 pertaining to this tube is connected back to the other side of the commutator zero through line 83. The YU and XR deflector plates of the units tube are connected through a wire 102 back to the terminals 58 and 67 of the amplifier unit through the circuit 90 previously traced. The XL deflecting plate of the units tube is connected to a wire 103 back through wire 87 to terminal 57 of the amplifier unit. The YL deflecting plate of the units tube is connected back through wire 104, line 91 to the terminal 66 of the amplifier unit.

The above circuits will cause 0 to be displayed by the units cathode ray tube.

Referring now to the tens cathode ray tube, tap 80 of the grid bias resistor connects through the 81 switch arm to a line 105 which leads to one side of the 0T1 relay contacts now closed due to the energization of the 0T relay which is brought about as previously described. The circuit through the 0T1 contacts if traced will be found to extend to one side of the zero commutator. Closure of these commutator contacts completes a circuit at the proper time when the zero portion of the track is being scanned to remove the higher negative bias from the tens cathode ray tube. The other side of the shunting circuit is completed through wire 83 as previously explained for the other tubes. The YU and XR deflecting plates connect to a line 90, which extends to amplifier terminals 58 and 67. The XL deflecting plate of the tens tube connects to line 87 which extends to terminal 57 of the amplifier unit. The YL deflecting plate of the tens tube is connected to line 91 which extends back to the 66 amplifier terminal. The above described connections will cause the tens cathode ray tube to display 0.

Referring to Fig. 9a, it will be noted that the 0T relay is in circuit with all of the segments 34 from 0 to 9 inclusive. When switch arm 32 passes from the 9th segment spot 34 to the tens spot, the relay 0T will be subsequently out of circuit and a relay 1T will be placed in circuit. With relay 1T in circuit relay contacts 1T1 (Fig. 9a) will become closed and this will establish a changed circuit so that the one commutator now controls the tens cathode ray tube. It will be noted that the 105 circuit which was previously traced to the tens cathode ray tube will upon closure of contacts 1T1 extend to the one commutator instead of the 0 commutator. With the switch 32 standing on the tens spot the 10U relay will be energized. The contacts 10U3 of this relay 10U are in shunt with the contacts 0U3. As the switch arm 32 moves up to the eleventh, twelfth and thirteenth segment positions the circuit relations will be successively changed to the units cathode ray tube so that such tube will in turn display 1, 2, 3 and so on.

According to the present invention wherein three cathode rays are utilized, it will be noted that the circuits extending from the deflecting plates XL, XR, YU and YL to the amplifier are common for all tubes. The return circuits from the cathodes to the controlling commutators is common for all tubes (note circuit 83 which extends from tens cathode ray tube to one side of all the commutators 38). The only circuits which are individual to the different tubes are bias control circuits for grids 13 which extend to the commutators. As shown, three of such circuits are provided. If the display device included a greater number of tubes, an additional bias circuit would have to be provided for each extra tube. The foregoing arrangement simplifies and minimizes wiring since common circuits are utilized for the deflecting plates of all tubes. With previous systems in changing from one display to another, it was necessary to change the deflector plate circuits and this necessitated additional circuits over the arrangement here shown. It will be further appreciated that commutators or timing selectors operate in synchronism and in timed relation with the rotatable element or disk, and that the digit selecting means is adapted to call into action one commutator or another depending upon which digit is to be displayed. The digit selecting means determines the denominational order of display of a selected character.

In general explanation of the operation of the system circuit connections are such that all tubes, during one complete revolution of the disk, are so connected that they would tend to display all characters of a set of different characters. The timing selectors or commutators block out the display of all but the selected character or characters. The selection of the commutators is in turn under the control of the digit selecting devices.

Referring now to the modified embodiment shown in Figs. 11 to 17 inclusive, the disk 40 heretofore described had a track configuration so that it successively displayed the outlines of each of the different digit characters, including zero. In lieu of such an arrangement previously described a disk having a different track configuration may be provided whereby a composite character outline can be traced on the screen of each tube. Then by selecting parts from this composite outline and rejecting other parts there may be a selected display of any single character derived from the composite character outline. The manner of laying out the previous disk has been explained in detail.

Figures 11, 12, 13, 14, 15:
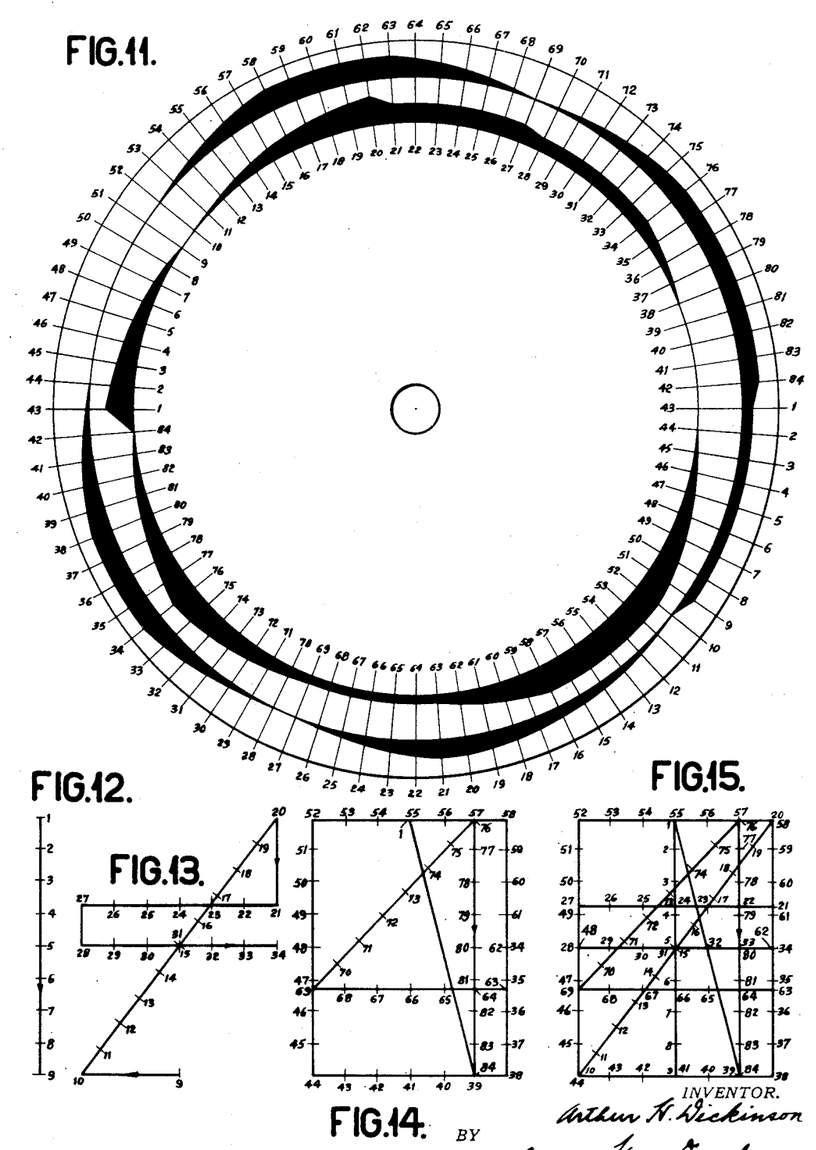
Fig. 11 shows a modified embodiment of pattern component emitter disk which is adapted to control tracing of the outlines of a composite character. From this composite character any one character of a series of different characters may be derived by utilizing a part or parts of the composite character.
Figs. 12, 13 and 14 are views showing portions of the composite character with numbers at various points thereon which correspond to like numbered points around the disk of Fig. 11.
Fig. 15 is a view of the complete composite character.

Referring now to the substitute disk 40A (Fig. 11) which is utilized in the modified embodiment, Fig. 12 shows the portions of the composite character which are utilized for the vertical lines to depict the numeral 1. It will be noted that the vertical part of the numeral 1 comprises points 1 to 9 inclusive on the disk and as before the 40X track is the outer track and the Y track is the inner track designated 40Y. Fig. 11 shows the configuration of the Y and X tracks for depicting the character 1 upon the rotation of the disk from point 1 through 9. The manner of obtaining the track width at any given point is the same for the present embodiment as for the previous embodiment and accordingly this need not be further described.

Figure 17:
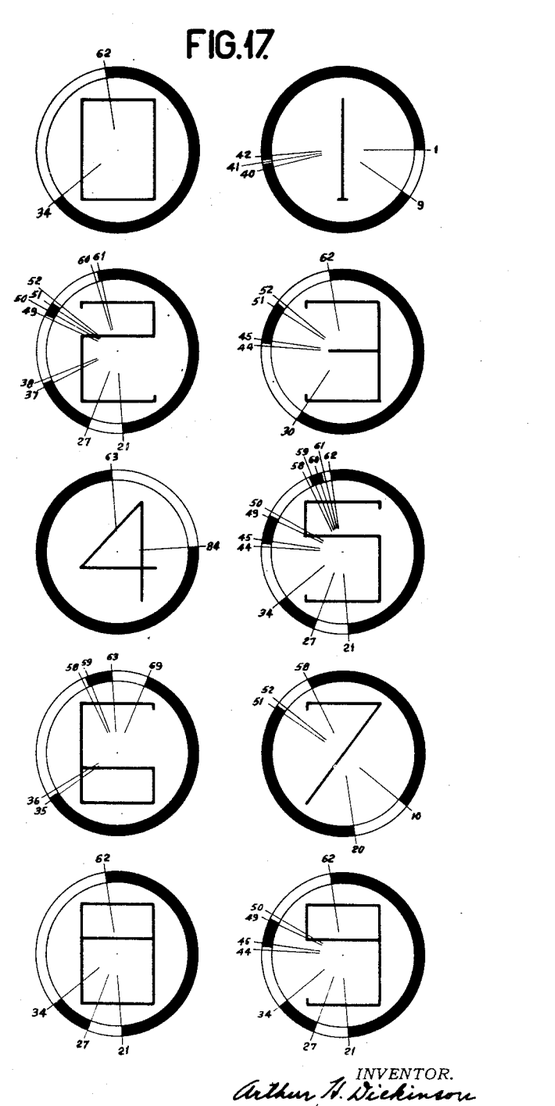
Fig. 17 shows enlarged views of the different commutator of Fig. 16. Each commutator is inscribed with its related character which is selected by the commutator from the composite character.

Fig. 13 shows the next part of the composite character traced by the disk having correspondingly numbered disk positions. For example, upon traverse of the disk from point 10 to point 20, the sloping part of the character 7 (see Fig. 17) will be traced. The points 21 to 27 denote a horizontal line tracing, see the second horizontal line from the top in characters 2, 5, 8 and 9 (Fig. 17). In Fig. 13, the points 28 to 34 inclusive show the points on the disk which are traversed in tracing a central horizontal line which may be noted in any character. For example, character 3 has a part with this central horizontal line in it.

Fig. 14 shows another section of the composite character which is traced by the disk in revolving from point 34 to terminating point 84. This figure need not be explained in detail, but it may be stated, for example, that the character 0 is traced upon rotation of the disk from point 34 to point 62 inclusive (see Fig. 17). Character 4 is likewise traced from point 63 to point 84 inclusive.

Referring to the diagonal line from point 84 back to point 1, this represents the zone of disk movement to bring the tracing beam back to the starting point for another composite character.

Fig. 15 shows the complete composite character outline. It is a consolidation on view of the previously mentioned component part views shown in Figs. 12, 13 and 14.

It will be understood that if high negative bias be removed from all of the tubes during one complete revolution of the disk, the tubes will display the composite outline shown in Fig. 15. On the other hand if it is desired to block out a part or parts, high negative bias will be applied during such portion of the disk rotation when blocking out is desired. This is effected by commutator devices which will now be described.

Figure 16:
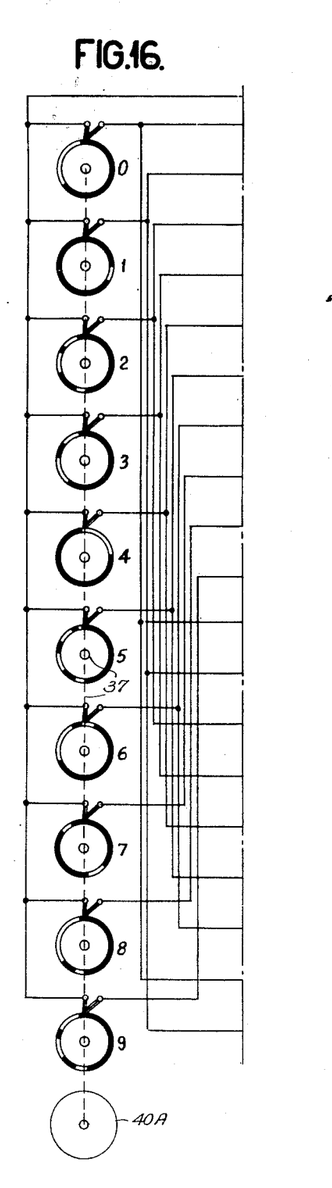
Fig. 16 shows a modified form of commutator switching device with certain wiring adapted for use in connection with the modified form of disk shown in Fig. 11.

Referring now to Figs. 16 and 17 in lieu of the timing commutator selectors 38 as previously described a different set of commutator timing devices 38A are now provided. These commutator devices in lieu of being of the single conducting segment type are some of single segment type and others of multiple segment type.

Referring first to the 0 commutator it will be noted that this commutator is adapted to remove negative bias intermediate points 34 to 62 of the disk and in this way the character 0 will be depicted by the cathode ray tube or tubes. When the remaining portion of the commutator is being traversed and the disk is rotating through the rest of its revolution display of unwanted parts of the composite character will be suppressed.

Referring now to the number 1 commutator, this removes the bias from points 1 to 9 to permit tracing of the vertical part of the digit 1. The bias is also removed shortly after point 40 to just before point 42 to depict the small tab at the bottom of the 1.

With reference to the number 2 commutator, it will be noted that bias is removed from about point 50.5 (see Fig. 14) and such bias is removed to point 60.75. This causes tracing of the upper horizontal part of the 2 and the right hand part of the 2. Bias is also removed from point 21 to point 27 (see Fig. 13) to trace the middle bar of the 2. Bias is also removed from point 37.5 to point 49¼ to trace the lower part of the 2. It is believed that no further description or explanation is required for the other commutators of the set since their timing relations are shown on the enlarged diagram (Fig. 17).

It will be understood that the commutators of the modified embodiment are rotated in synchronism and in timed relation with the rotatable disk 40A and the selecting means which calls the commutators into operation or keeps them out of operation comprises the digit selecting mechanism which was previously described in connection with the main embodiment.

What is claimed is:

1. A character displaying apparatus, including a cathode ray tube having a screen and deflector plates which receive changing potentials to trace the outlines of a set of different characters, means to generate such potentials including a rotatable element having segment portions from which selection is to be made and means to permit or suppress impingement of the electronic beam upon the screen whereby display of a selected character may be effected with display or other characters suppressed, said last mentioned means including timed means which operate in synchronism with the movable element.

2. A character displaying apparatus, comprising a cathode ray tube having deflecting plates and a control grid, generating means for generating electrical components for controlling the tracing of the outlines of a set of different characters, said generating means including a movable element having portions for controlling the generation of the aforesaid components and from which selection is to be made, said deflecting plates having maintained connection to said generating means, a plurality of timed means for applying and removing potentials upon the control grid of the tube means to operate said timed means in synchronism with the movable element of the generating means, and selecting means for selectively associating one or the other of the set of timed means to the control grid of the tube whereby a selected character may be displayed and the display of the other characters of the set suppressed.

3. A character displaying apparatus comprising a plurality of cathode ray tubes each having deflecting plates and a control grid, generating means for generating electrical components for controlling the tracing of the outlines of a set of different characters, said generating means including a movable element having portions for controlling the generation of the aforesaid components and from which selection is to be made, said plurality of cathode ray tubes having their deflecting plates connected in multiple to the generating means, timed means for applying and removing potential upon the control grids of the tubes, means to operate the timed means in synchronism with the movable element of the generating means and character and tube selecting means for selectively connecting the timed means to the control grids of the tubes whereby selected like or different characters may be displayed by the tubes.

4. A character displaying apparatus comprising a plurality of cathode ray tubes one for each denominational order, each tube having a control grid and a screen and each tube having deflecting plates which are adapted to receive changing potentials to cause the electronic beam of each tube to trace the outlines of a set of different characters, means to generate such potentials, including a movable element having different portions from which selection is to be made, means to continuously apply such potentials to the plates of all the tubes, a set of timing means one for each different character for controlling the application of potentials to the control grids of any of the tubes, said set of timing means operating in synchronism with the movable element, a plurality of connecting devices for individually connecting the timing means related to the character or characters to be displayed to the control grid or grids of the tube or tubes, said connecting devices determining the columnar order of character display as well as the particular character which is displayed in an order or orders.

5. Control apparatus for controlling electron beams of a cathode ray character displaying device, including in combination a rotatable element having a pair of light transmitting controlling tracks thereon with a pair of photo-cells receiving varying amounts of light under control of said tracks upon rotation of said element, amplifying means controlled by said photo-cells, said amplifying means affording output potential for controlling the aforesaid electron beams of the cathode ray device, said tracks of said rotatable element having a configuration to control tracing of the outlines of a complete set of different characters upon each rotation of said rotatable element, and means for selecting which one of the different characters is to be displayed including a set of selectively effective timed means which move in synchronism with the rotatable element.

6. The invention according to claim 5 wherein the tracks have a configuration to control the tracing of a composite character from which any character of a set of different characters may be displayed by utilizing some part or parts of the composite character and wherein the timed means affords selection of the parts or parts which are displayed.

7. Control apparatus for a cathode ray tube displaying device comprising a rotatable element having light controlling tracks thereon to variably transmit an amount of light upon rotation of the element, photo-cell means variably influenced according to the variable amount of light received thereby, said light controlling tracks having a configuration such that upon rotation of the element the photo-cell means will have light variations which are impressed thereon representative of components of a series of different characters in succession, timing selector means one for each character operated in synchronism and in timed relation with the rotatable element for potentially establishing and interrupting circuits to the cathode ray tubes, digit selecting means for calling into action the related timing selecting means, and amplifying means controlled by the photo-cells for transmitting changing potentials to the cathode ray tube.

8. An apparatus of the class described, including in combination, a pattern component emitter unit comprising means to generate and emit potentials representative of the components of a succession of different characters, said emitter unit comprising a continuously movable means, a cathode ray tube displaying device including tubes with deflecting plates which receive said generated potential, timing selector means operated in timed relation and synchronism with movable means of the emitter unit, and digit selector means intermediate the timed selector means and control grids of the cathode ray tubes for the purposes described.

9. In a cathode ray displaying apparatus wherein amplifying means supplies current potentials to the deflecting plates of cathode ray tubes and including in combination photo-cell means for controlling the amplifying means, means to apply continuously varying amounts of light to the photo-cell means to cause the photo-cells to first generate components representative of one character and to thereafter generate components representative of other different characters of a set in succession and selecting means including timing means to control a cathode ray tube whereby it displays the selected character.

ARTHUR H. DICKINSON.

CERTIFICATE OF CORRECTION.

Patent No. 2,264,623.　　　　　　　　　　　　　　December 2, 1941.

ARTHUR H. DICKINSON.

It is hereby certified that error appears in the printed specification of the above numbered patent requiring correction as follows: Page 4, second column, lines 60 and 63, for "preliminary" read --preliminarily--; page 7, second column, line 63, claim 1, for "or" read --of--; and that the said Letters Patent should be read with this correction therein that the same may conform to the record of the case in the Patent Office.

Signed and sealed this 27th day of January, A. D. 1942.

(Seal)　　　　　　　　　　　　　　　　　　　　　Henry Van Arsdale,
　　　　　　　　　　　　　　　　　　　　　　　Acting Commissioner of Patents.